US011667212B2

(12) United States Patent
Vidhi et al.

(10) Patent No.: US 11,667,212 B2
(45) Date of Patent: *Jun. 6, 2023

(54) ALLOCATION OF ELECTRICAL ENERGY WITHIN A STORAGE CELL

(71) Applicant: Inventus Holdings, LLC, Juno Beach, FL (US)

(72) Inventors: Rachana Vidhi, Palm Beach Gardens, FL (US); Prasanna Shrivastava, Palm Beach Gardens, FL (US); Daniel M. Brake, Hobe Sound, FL (US); Matthew S. Handel, Jupiter, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,358

(22) Filed: Nov. 8, 2021

(65) Prior Publication Data

US 2022/0055498 A1 Feb. 24, 2022

Related U.S. Application Data

(63) Continuation of application No. 16/268,141, filed on Feb. 5, 2019, now Pat. No. 11,167,659.

(51) Int. Cl.
*B60L 55/00* (2019.01)
*G05B 19/042* (2006.01)
(Continued)

(52) U.S. Cl.
CPC .............. *B60L 55/00* (2019.02); *B60L 58/20* (2019.02); *G05B 19/042* (2013.01); *G06Q 40/04* (2013.01);
(Continued)

(58) Field of Classification Search
CPC ........ B60L 55/00; B60L 58/20; B60L 53/665; B60L 53/64; G05B 19/042;
(Continued)

(56) References Cited

U.S. PATENT DOCUMENTS 6,941,197 B1 9/2005 Murakami et al.
8,198,859 B2 6/2012 Tyler et al.
(Continued)

FOREIGN PATENT DOCUMENTS

EP 2453545 5/2012
EP 2991854 3/2016
(Continued)

OTHER PUBLICATIONS

Jung, J. et al., Shared-Taxi Operations with Electric Vehicles, its.uci.edu. Institute of Transporlalion Studies: University of California, Irvine (May 2012).
(Continued)

*Primary Examiner* — Ziaul Karim
(74) *Attorney, Agent, or Firm* — Fleit Intellectual Property Law; Jeffrey N. Giunta

(57) ABSTRACT

Systems and methods for allocating electrical energy within a storage cell. Energy stored in an energy storage cell is allocated to multiple energy sub-partitions. Each energy sub-partition is associated with a user. A request to buy an amount of energy from an energy sub-partition assigned to another user is sent by a present user to at least one respective user in the plurality of users. Based on sending the request to sell an amount of energy, at least one response with an offer to sell energy to the present user is received. Acceptance of a selected offer within the at least one response is received, where the selected offer was sent by a winning user. The amount of energy is re-allocated from an energy sub-portion allocated to the winning user to an
(Continued)

energy sub-portion associated with the present user based on receiving the acceptance.

19 Claims, 6 Drawing Sheets

(51) Int. Cl.
*G06Q 40/04* (2012.01)
*H02J 7/00* (2006.01)
*H02J 3/00* (2006.01)
*B60L 58/20* (2019.01)
*G06Q 50/06* (2012.01)

(52) U.S. Cl.
CPC .............. *G06Q 50/06* (2013.01); *H02J 3/008* (2013.01); *H02J 7/0068* (2013.01); *G05B 2219/25357* (2013.01)

(58) Field of Classification Search
CPC ...... G05B 2219/25357; G05B 19/0426; G06Q 40/04; G06Q 50/06; H02J 7/0068; H02J 3/008; H02J 3/322; Y02E 60/00; Y04S 10/126; Y04S 30/14; Y02T 90/167; Y02T 10/7072; Y02T 90/12; Y02T 10/70
See application file for complete search history.

(56) References Cited

U.S. PATENT DOCUMENTS

| | | | |
|---|---|---|---|
| 8,872,379 B2 | 10/2014 | Ruiz et al. | |
| 8,941,463 B2 | 1/2015 | Rovik et al. | |
| 8,981,717 B2 | 3/2015 | Hayashi et al. | |
| 9,171,268 B1 | 10/2015 | Penilla et al. | |
| 9,233,620 B2 | 1/2016 | Hara | |
| 9,260,030 B2 | 2/2016 | Falk et al. | |
| 2004/0024717 A1* | 2/2004 | Sneeringer | G06Q 50/06 705/412 |
| 2008/0221746 A1 | 9/2008 | Plishner | |
| 2008/0281663 A1* | 11/2008 | Hakim | H02J 3/008 705/7.25 |
| 2011/0246252 A1* | 10/2011 | Uesugi | G06Q 50/06 705/7.12 |
| 2011/0302078 A1* | 12/2011 | Failing | B60L 53/126 700/297 |
| 2013/0046660 A1 | 2/2013 | Lowenthal et al. | |
| 2014/0143002 A1 | 5/2014 | Aisu | |
| 2014/0200723 A1* | 7/2014 | Roy | H02J 3/46 700/291 |
| 2014/0277795 A1* | 9/2014 | Matsuoka | H04W 12/06 700/291 |
| 2014/0351010 A1* | 11/2014 | Kong | G06Q 30/0201 705/7.29 |
| 2015/0066231 A1* | 3/2015 | Clifton | H02J 3/381 307/46 |
| 2015/0094957 A1* | 4/2015 | Hyde | B60L 53/63 701/537 |
| 2016/0082855 A1 | 3/2016 | Yoshizawa | |
| 2017/0098176 A1* | 4/2017 | Hirose | G06Q 30/0645 |
| 2017/0129349 A1 | 5/2017 | Solomon | |
| 2017/0129361 A1 | 5/2017 | Scaringe | |
| 2017/0307392 A1 | 10/2017 | Kitajima et al. | |
| 2018/0031381 A1* | 2/2018 | Delaruelle | B60L 58/15 |
| 2018/0198277 A1* | 7/2018 | Bollermann | H02J 3/46 |
| 2018/0228007 A1* | 8/2018 | Siefer | H05B 47/18 |

FOREIGN PATENT DOCUMENTS

| | | |
|---|---|---|
| JP | 2007295650 | 11/2007 |
| JP | 5857581 | 2/2016 |
| WO | 2015018270 | 2/2015 |
| WO | 2016006205 | 1/2016 |
| WO | 2017083630 | 5/2017 |
| WO | 2018079155 | 5/2018 |

OTHER PUBLICATIONS

Nguyen, Hung & Song, Ju Bin. (2012). Optimal Charging and Discharging for Multiple PHEVs with Demand Side Management in Vehicle-to-Building. Communications and Networks, Journal of. 14. 662-671. 10.1109/JCN.2012.00032.

Mehrabi, Abbas & Dadlani, Aresh & Moon, Seungpil & Kim, Kiseon. (2016). Profit-aware Online Vehicle-to-Grid Decentralized Scheduling under Multiple Charging Stations.

Li, Z., Chowdhury, M., Bhavsar, P. et al. International Journal of Automotive Technolology, vol. 16, No. 5, pp. 827-837 (2015).

He, Yifeng & Venkatesh, B & Guan, Ling, Optimal Scheduling for Charging and Discharging of Electric Vehicles. Smart Grid, IEEE Transactions.

\* cited by examiner

ALLOCATION OF ELECTRICAL ENERGY WITHIN A STORAGE CELL

FIELD OF THE DISCLOSURE

The present disclosure generally relates to managing energy stored within an energy storage system, and more particularly to managing allocation of stored energy among several users sharing the energy storage system.

BACKGROUND

Electric vehicles are an example of vehicles that use rechargeable energy storage systems, such as a battery, to propel the vehicle. In an example, a user of an electric vehicle charges the battery of the electric vehicle at a charging station, and then drives the vehicle under electric power by drawing energy from the battery. As the energy stored in the battery depletes, the user again connects the electric vehicle to a charging station to recharge the battery. Additional uses of energy stored in a battery of an electric vehicle include Vehicle-to-Grid configurations. In a Vehicle-to-Grid configuration, a utility or other entity that is involved with providing electrical power to a charging station used by an electric vehicle is allowed to draw energy from the battery of the electric vehicle. The energy drawn from the battery of the electric vehicle is able to be returned to the electrical grid providing power to the charging station. In some Vehicle-to-Grid configurations, the entity controlling the charging station is able to vary the amount of energy provided to or drawn from a connected electric vehicle in order to accommodate various goals, such as load management or voltage regulation on the electrical grid connected to the charging station.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
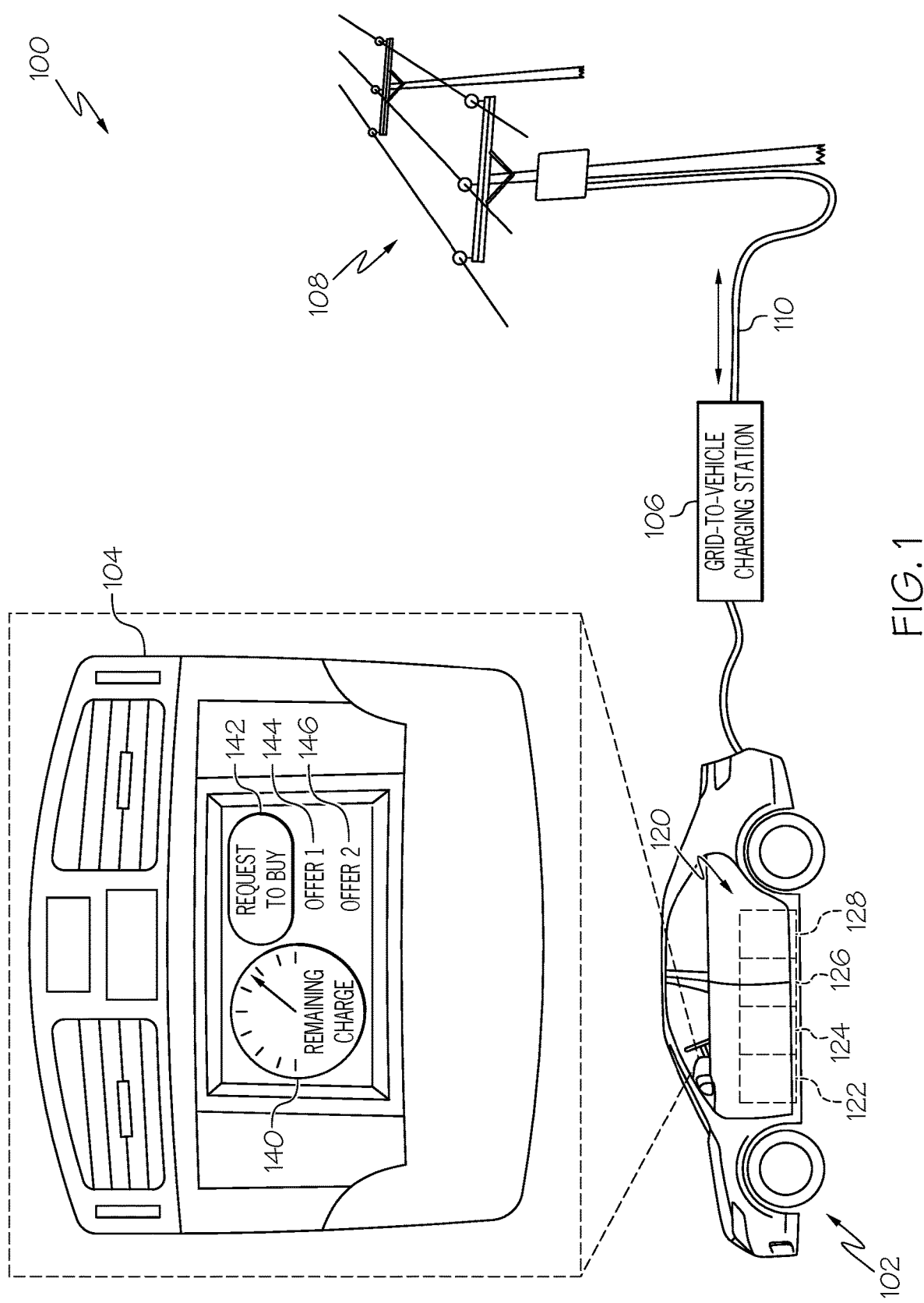
FIG. 1 illustrates an example operational context for the systems and methods described herein.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods manage the allocation of energy stored in an energy storage cell, such as an electrical battery. In an example, an electric vehicle that is shared by a number of users has a battery that is used to store energy to power the vehicle. The below described systems and methods support allocating energy stored in the battery of the vehicle to energy sub-partitions with one energy sub-partition allocated to each user of the vehicle. The below described systems and method manage the allocation of charging and discharging of the battery according to which user is performing the charging and discharging.

In an example, a user of the vehicle is able to send requests to other users of the vehicle to buy energy from the energy sub-partition associated with another user of the vehicle. In such an example, a present user, such as the user presently driving the vehicle, may be depleting the energy in his or her energy sub-partition and requires more energy to complete his or her trip. Such a present user is able to send a request to other users of the vehicle to buy energy from energy sub-partitions associated with those other users. In some examples, other users with energy sub-partitions are able to respond with a response containing an offer to sell energy from their associated energy sub-partitions. In some examples, each responding user is able to specify a price that the present user would have to pay to buy an amount of energy. If the present user agrees to buy the energy, the agreed upon amount of energy is re-allocated from the energy sub-partition associated with the selling user to the energy sub-partition of the present user. In an example, this re-allocation is implemented by changing values in variables stored in a processor that define an amount of energy allocated to each user. In an example, no transfer of energy within the battery is performed when re-allocating the energy.

In some examples, multiple other users are able to respond to a request to sell energy with separate offers to sell energy to the present user at a price specified by the responding user. In some such examples, the present user is able to select one of the responses, such as the response with the lowest price, as the response containing the offer accepted by the present user. The user that sent the response selected by the present user is then the user from which the present user will purchase energy, which is referred to herein as a winning user. In such examples, the present user accepts the response and funds are transferred to the winning user from the present user, and the specified amount of energy is re-allocated from the energy sub-partition associated with the winning user to the energy sub-partition associated with the present user.

In some examples, one or more energy sub-partitions in the battery are able to be associated with a user that is not an operator of the electric vehicle. In an example, an energy sub-partition of the battery is able to be associated with a user that is, for example, an electric utility or other energy consumer outside of the vehicle. In an example, the vehicle is able to participate in a Vehicle-to-Grid operation where a utility or other user of electricity outside the vehicle is associated with an energy sub-partition of the battery and energy is able to be charged to or discharged from the battery of the vehicle when, for example, the vehicle is connected to a Vehicle-to-Grid capable charging station. In an example, the electric utility or other energy consumer outside the vehicle is also able to respond to requests to buy energy and sell energy from its energy sub-partition to the present user of the vehicle.

FIG. 1 illustrates an example operational context 100 for the systems and methods described herein. The example operational context 100 is an example of an electric vehicle 102 that has a battery 120. The illustrated battery 120 is an example of an energy storage cell that is used by the electric vehicle to provide power to components in the electric vehicle 102. In further examples, other energy storage cells are able to be used by an electric vehicle 102 to support operations that are described below.

In general, the battery 120 is able to store a maximum amount of energy. In some examples, a processor maintains multiple energy sub-partitions and metaphorically allocates energy stored in the battery 120 into each energy sub-partition. In some such examples, each energy sub-partition is associated with a different user. In some examples, the different users who are associated with at least some of the energy sub-partitions include persons who share the electric vehicle 102.

The battery 120 of the electric vehicle 102 is able to be charged by connecting the electric vehicle 102 to any suitable charging station or other charging facility. In the present discussion, connecting the electric vehicle 102 to any type of charging station is referred to as a charging event. In general, the battery 120 of the electric vehicle 102 is recharged by adding energy received from a charging station to which the electric vehicle is connected. Charging of the battery 120 is also able to be achieved by other operations, such as by regenerative braking when the vehicle is operating, other energy sources such as solar cells on the roof the car, any other type of charging, or combinations of these.

In the illustrated example, electric vehicle 102 is connected to a Vehicle-to-Grid charging station 106 in order to charge the battery 120. The illustrated Vehicle-to-Grid charging station 106 is an example of a charging station that allows electrical energy to be provided to the electric vehicle 102 to charge the battery 120. The Vehicle-to-Grid charging station 106 receives electrical energy from an electrical grid 108 via a Vehicle-to-Grid charging station interconnection 110. In addition to providing energy to the electric vehicle 102 to charge the battery 120, the Vehicle-to-Grid charging station 106 also allows energy to be drawn from the battery 120 that is then delivered back to the electrical grid 108 via the Vehicle-to-Grid charging station interconnection 110. In the illustrated example, the Vehicle-to-Grid charging station interconnection 110 allows energy to be delivered from the electrical grid 108 to the Vehicle-to-Gird charging station 106 and also allows energy from the Vehicle-to-Gird charging station 106 to be delivered back to the electrical grid 108. In further examples, the electric vehicle 102 is able to be connected to any type of charging station, including a charging station that only supports delivering energy to the electric vehicle 102 to support charging of the battery 120.

The illustrated battery 120 conceptually depicts energy sub-partitions that represent an example of energy allocated to different users of the electric vehicle. The illustrated battery 120 includes a first energy sub-partition 122, a second energy sub-partition 124, a third energy sub-partition 126, and a fourth energy sub-partition 128. In an example, each of these sub-partitions is associated with a different user who shares the electric vehicle 102. In an example, the first energy sub-partition 122 is associated with a first user, the second energy sub-partition 124 is associated with a second user, the third energy sub-partition 126 is associated with a third user, and a fourth energy sub-partition 128 is associated with a fourth user. In such an example, the fourth user is able to be an electric utility or other user of the battery 120 that draws energy from the battery 120 for uses outside the electric vehicle 102.

Although the illustrated battery 120 is shown to have a number of energy sub-partitions, in an example the battery 120 of an electric vehicle 102 stores a total amount of energy and a processor maintains date that indicates respective allocations of that total amount of energy for each energy sub-partition. In the following discussion, the amount of energy that is stored in the battery 120 that is metaphorically allocated to each energy sub-partition is accumulated in a data element referred to herein as a respective accumulated energy value that is associated with each user. In an example, a present user of the battery is identified and the processor adjusts the energy allocated to the energy sub-partition associated with the present user according to amounts of energy that are discharged from the battery 120 or charged into the battery 120. In an example, this adjustment is performed by subtracting values corresponding to those amounts of energy from, or adding values corresponding to those amounts of energy to, the accumulated energy value associated with the present user.

In various examples, the present user who is discharging or charging the battery is able to be determined by any suitable technique. For example, a user who is presently driving the electric vehicle 102 is able to be determined by any suitable technique to be the user discharging the battery 120. A user who has connected the electric vehicle 102 to a charging station is able to be determined to be the present user who is charging the vehicle. In various examples, a present user driving the vehicle or who is connecting the vehicle to a charging station is able to be determined by any suitable technique. For example, each user of the vehicle is able to have an electronic identification token, such as a token with an RFID chip, or any other type of identification token. A device within the electric vehicle 102 is able to detect the identification token and thereby identify the present user of the vehicle. In an example, an energy sub-partition associated with an electric utility or other user external to the vehicle is also able to be determined by any suitable technique, such as by communications between a Vehicle-to-Grid charging station 106 and processor maintaining and adjusting the allocations of stored energy within each energy sub-partition.

In an example, the operator of the electrical grid 108 is able to selectively configure the Vehicle-to-Gird charging station 106 to charge or discharge the battery 120. Such charging or discharging operations of the battery 120 are able be performed to, for example, support load management or other operational goals for the electrical grid 108. In an example, the energy added to the battery 120 or discharged from the battery 120 is added to or removed from the energy allocated to the energy sub-partition of the battery 120 that is associated with that electric utility when these charging or discharging operations are performed by the electric utility operating the electrical grid 108. In an example, associating one or more energy sub-partitions with an electric utility allows the electric utility to efficiently and effectively share the use of the battery 120 between the operator of the electrical grid 108, or other users of the battery 120 that are external to the electric vehicle 102, and one or more users of the electric vehicle 102. In various examples, the operator of the electrical grid 108 is able to contribute to the costs of purchasing, operating, or both, of the electric vehicle 102. In an example, contributing to such costs is able to benefit the other users of the electric vehicle 102, owners of the electric vehicle 102, or both.

The electric vehicle 102 has a user interface 104 that provides visual information to persons inside the electric vehicle 102, such as the driver of the electric vehicle 102. The user interface 104 in this example provides visual information and also includes a touch sensitive display to allow a user to select an item presented on the user interface 104 by touching the screen near the item. In further examples, an electric vehicle 102 is able to have any suitable user interface. In an example, a user interface similar to user interface 104 is able to be provided via a smart phone or other personal electronic device of the user. In some examples, a similar user interface is able to be provided at locations remote from the electric vehicle 102, such as by a computer, personal electronic device such as a smartphone or tablet, by another device, or combinations of these.

The user interface 104 includes a remaining charge gauge 140, a "REQUEST TO BUY" button 142, an "OFFER 1" text 144, and an "OFFER 2" text 146. As described in further detail below, the remaining charge gauge 140 presents an indication of the energy remaining in the energy sub-portion associated with the present user of the electric vehicle 102. In such an example, when a first user is the present user of the electric vehicle 102, the remaining charge gauge 140 does not present an indication of the total amount of energy stored in the battery 120, but rather the amount of energy stored in the first energy sub-partition 122, which is associated with the first user.

The "REQUEST TO BUY" button 142 is an example of facility of a user interface 104 that allows a present user to initiate sending, to other users associated with respective energy sub-partitions, a request to buy an amount of energy that is stored in another user's energy sub-partition. In various examples, the "REQUEST TO BUY" button 142 is able to be configured to cause requests to buy energy to be sent to all users that are associated with energy sub-partitions within the battery 120, to be sent to users who have "opted into" receiving requests to buy from other users of the electric vehicle 102, to be sent to any subset of users who are associated with energy sub-partitions of the battery 120, or any combination of these. In an example where at least one of the users that is associated with an energy sub-partition of the battery 120 is an electric utility, the "REQUEST TO BUY" button 142 is able to be configured to only send a request to buy an amount of energy to the electric utility that is associated with an energy sub-partition of the battery 120, to send such a request to all users or a subset of users including the electric utility that is associated with an energy sub-partition of the battery 120, any combination of these, or to any particular set of users that are associated with a respective energy sub-partition of the battery 120.

In various examples, a request to buy an amount of energy is able to specify an amount of energy that the present user of the electric vehicle 102 desires to buy. In further examples, the request may not specify an amount of energy. In some examples, users responding to a request to buy an amount of energy are able to specify an amount of energy that they are offering to sell to the present user of the electric vehicle. In general, the amount of energy the present user ultimately buys is able to be specified in the request to buy the energy that the present user sends to the other users, is able to be specified in a response by other users as offers to sell a specified amount of energy the other user specifies, combinations of these, or specified by any suitable technique.

The "OFFER 1" text 144 and the "OFFER 2" text 146 are presentations that indicate responses to a previously sent request to buy an amount of energy. In some examples, users who are associated with a respective energy sub-partition of the battery 120 are able to respond to a request to buy an amount of energy with offers to sell energy to the present user of the electric vehicle 102. Such offers are able to specify, for example, an amount of energy the responding user is offering to sell to the present user of the electric vehicle 102, a price for the amount of energy, other information or specifications, or combinations of these. The terms of the offers sent in by the other users are presented on the user interface 104. The terms of the offer by a first other user is presented as the "OFFER 1" text 144, and the terms of the offer by a second other user is presented as the "OFFER 2" text 146. In general, any number of other users are able to respond to the request to buy an amount of energy, and all such responses are presented by the user interface 104. In an example, the present user of the electric vehicle 102 is able to select an offer from another user by touching the associated text on the touch sensitive screen of the user interface 104. For example, the present user is able to select OFFER 1 by pressing the "OFFER 1" text 144. Such an action causes that offer to be accepted, and energy is transferred from the energy sub-partition associated with the user who sent OFFER 1.

In an example, a user responding to a request to buy energy is able to profit by selling energy to the present user for more than he or she paid for the energy when that other user charged the battery and thus added energy to his or her energy sub-partition. For example, a user who receives a request to buy energy from a present user is able record the cost of energy they purchased when charging the battery 120 and thus adding energy to his or her energy sub-partition. In such an example, that other user is able to respond to offers by buy energy with an offer to sell energy to the present user of the electric vehicle 102 at a higher price than he or she paid for the energy that was added to their energy sub-partition. Such an operation allows other users of the electric vehicle to profit from the sale of energy they had previously purchased to charge the battery 120 while providing the convenience to the present user of the electric vehicle to continue on their journey without having to recharge the battery 120. Such a convenience may be particularly valuable to the present user of the electric vehicle at times when it would be inconvenient or not possible for the present user of the electric vehicle 102 to recharge the battery 120.

Figure 2:
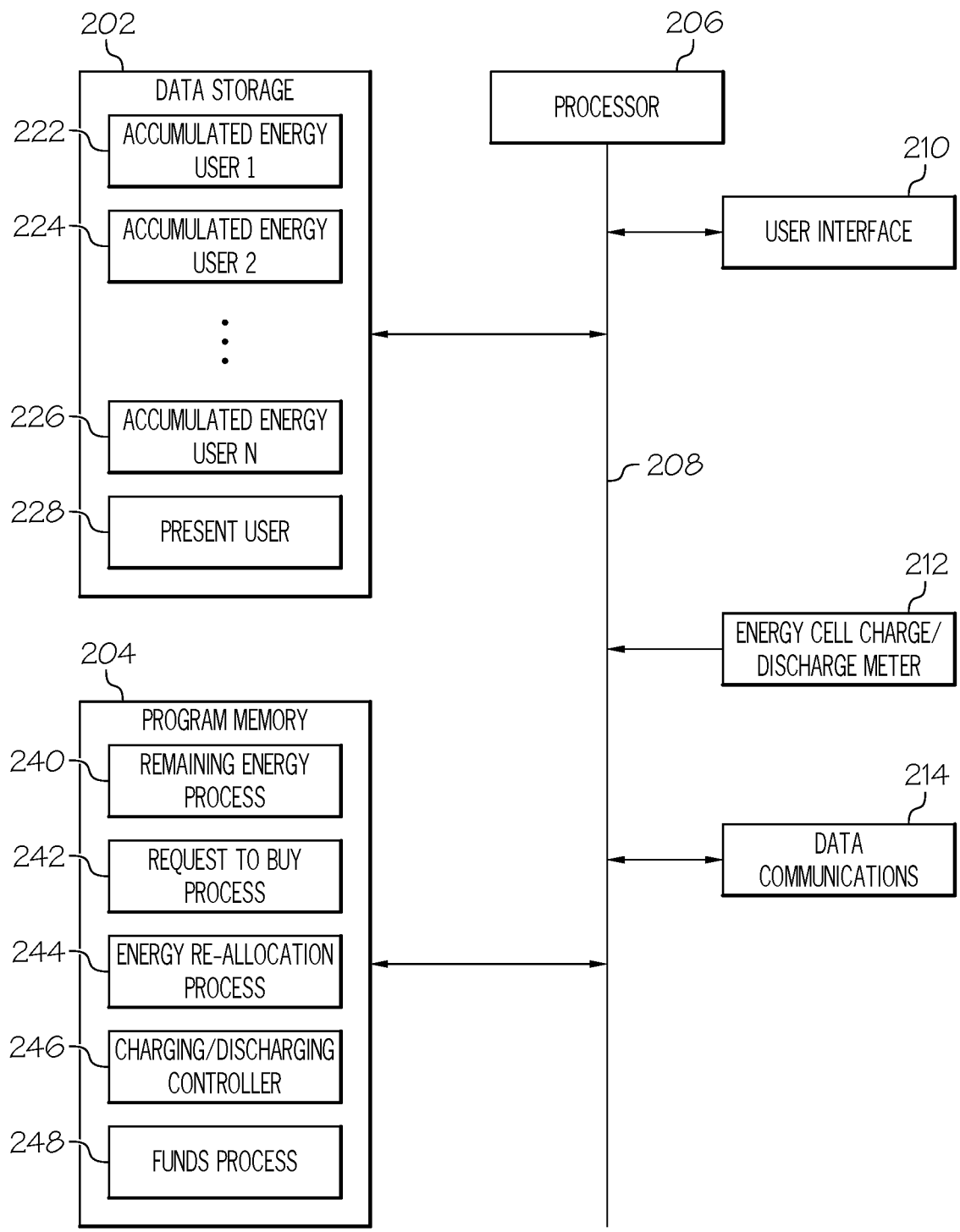
FIG. 2 illustrates a data processing architecture, according to an example.

FIG. 2 illustrates a data processing architecture 200, according to an example. The data processing architecture 200 is an example of processing components, peripheral components, and data storage components that are suited to implement the systems and methods described herein. Example data elements stored in the data storage components are also depicted. The description of the data processing architecture 200 references the above discussed example operational context 100. In an example, one or more elements depicted in the data processing architecture are located within the electric vehicle 102.

A processor 206 communicates with various components of the data processing architecture 200 via a data bus 208. The processor 206 is configured to perform various methods, including methods described herein, by accessing and executing programs stored in program memory 204. The processor 206, under control of programs stored in program memory 204, exchanges data with data elements within the data storage 202, a user interface 210, an energy cell charge/discharge meter 212, a data communications component 214, other components, or combinations of these.

The data storage 202 stores various data elements to support the operations of the systems and methods described herein. The depicted data storage 202 is shown to store an accumulated energy value for user 1 222, an accumulated energy value for user 2 224, and an accumulated energy value for user n 226. In various examples, accumulated energy values are separate date items that are able to be maintained in the data storage 202 for any number of users. As is discussed above, each accumulated energy value represents the amount of energy allocated into a respective energy sub-partition of battery 120 that is associated with its respective user.

The data storage 202 further stores a present user identifier 228. The present user identifier in an example is a data element that indicates the present user of the electric vehicle 102, and is used to support, for example, determinations of which accumulated energy value is to be updated with energy that is presently added to or discharged from the battery 120.

The above described user interface 104 is an example of the user interface 210. In general, user interface 210 is able to be any suitable user interface that presents information to a user, receives inputs from the user, presents and receives information and inputs from the user, or any combinations of these. In general, the user interface 210 is able to be a single unit, consist of several device located in proximity to each other or apart from each other, have any suitable configuration, or combinations of these. In some examples, the user interface 210 is able to be located remotely from the processor 206 and other elements of the data processing architecture 200 with communications between the processor 206 and those remote elements implemented by any suitable technique.

In an example, the user interface 210 supports determination of the present user of the electric vehicle 102. In some examples, the user interface 210 includes an RFID chip reader that can identify an RFID token carried by the present user of the electric vehicle 102. In other examples, a user is able to provide identification via any suitable input to the user interface 210, such as entry of a user identifier or other information which may include a password or other authentication information. The identification of the present user is provided to the processor 206 and stored in a present user identifier 228 within the data storage 202.

The energy cell charge/discharge meter 212 measures electrical energy that is provided to the battery 120. Such measurements are able to be in the form of measurements of electrical current flowing into or out of the battery 120, any other measurement of energy flowing into or out of the battery 120, or combinations of these. Such measurements are provided to the processor 206. In an example, the processor accumulates the energy provided to the battery 120, or discharged from the battery 120, to an accumulated energy value associated with the present user. As discussed in further detail below, the accumulated energy value indicates the amount of energy contained in the energy sub-partition associated with the present user.

The data communications component 214 supports communications between the processor 206 and other systems remote from the elements of the data processing architecture 200. In some examples, the data communications component 214 supports wireless data communications, such as via cellular data networks or other wide area data communications systems, between the processor 206 and other processors that are able to communicate via various systems, such as the Internet.

The program memory 204 stores various programs executed by the processor 206. A remaining energy process 240, which when executed by processor 206 becomes a remaining energy processor, operates to add or subtract values of energy to or from the accumulated energy value associated with the present user. For example, when user 1 is determined, such as by the user interface 210, to be the present user, energy added to or discharged from the battery 120, as measured by the energy cell charge/discharge meter 212, is added to or subtracted from the accumulated energy value for user 1 222.

The request to buy process 242, which when executed by processor 206 becomes a request to buy processor, processes requests to buy energy from other users, such as can be initiated by the present user by selecting the "REQUEST TO BUY" button 142. The request to by process 242 operates to send requests to buy an amount of energy from another user, receives responses with offers to sell energy to the present user, receives acceptance of an offer by the present user, and performs other communications and processing to support the present user's buying energy from another user. In an example, communications between the processor 206 and devices used by the other uses to whom the request to buy are sent are performed via the data communications component 214.

The energy re-allocation process 244, which when executed by processor 206 becomes a energy re-allocation processor, performs processing to re-allocate energy from an energy sub-partition associated with another user who is selling energy to the energy sub-partition associated with the present user. In an example, this processing include reducing the accumulated energy value associated the user selling the energy, as is stored in the data storage 202, and increasing the accumulated energy value associated with the present user as is also stored in the data storage 202.

The charging/discharging controller 246, when executed by processor 206, performs processing to control charging and discharging of the battery 120. In an example, the charging/discharging controller interacts with the energy cell charge/discharge meter to determine the amount of energy being added to or discharged from the battery 120. In some examples, the charging/discharging controller 246 further prevents further discharge of the battery 120 when the accumulated energy value for the present user, as is stored in the data storage 202, reaches zero. In an example, preventing such further discharge causes the electric vehicle 102 to be inoperable until more energy is added to the battery 120, or purchased from another user such as via the techniques described herein.

A funds process 248, which when executed by processor 206 becomes a funds processor, handles charging the present user for energy purchased from another user, and credits the other user with the funds paid by the present user. In some examples, further funds processing is able to be performed, such as charging service fees for the energy re-allocation processing.

Figure 3:
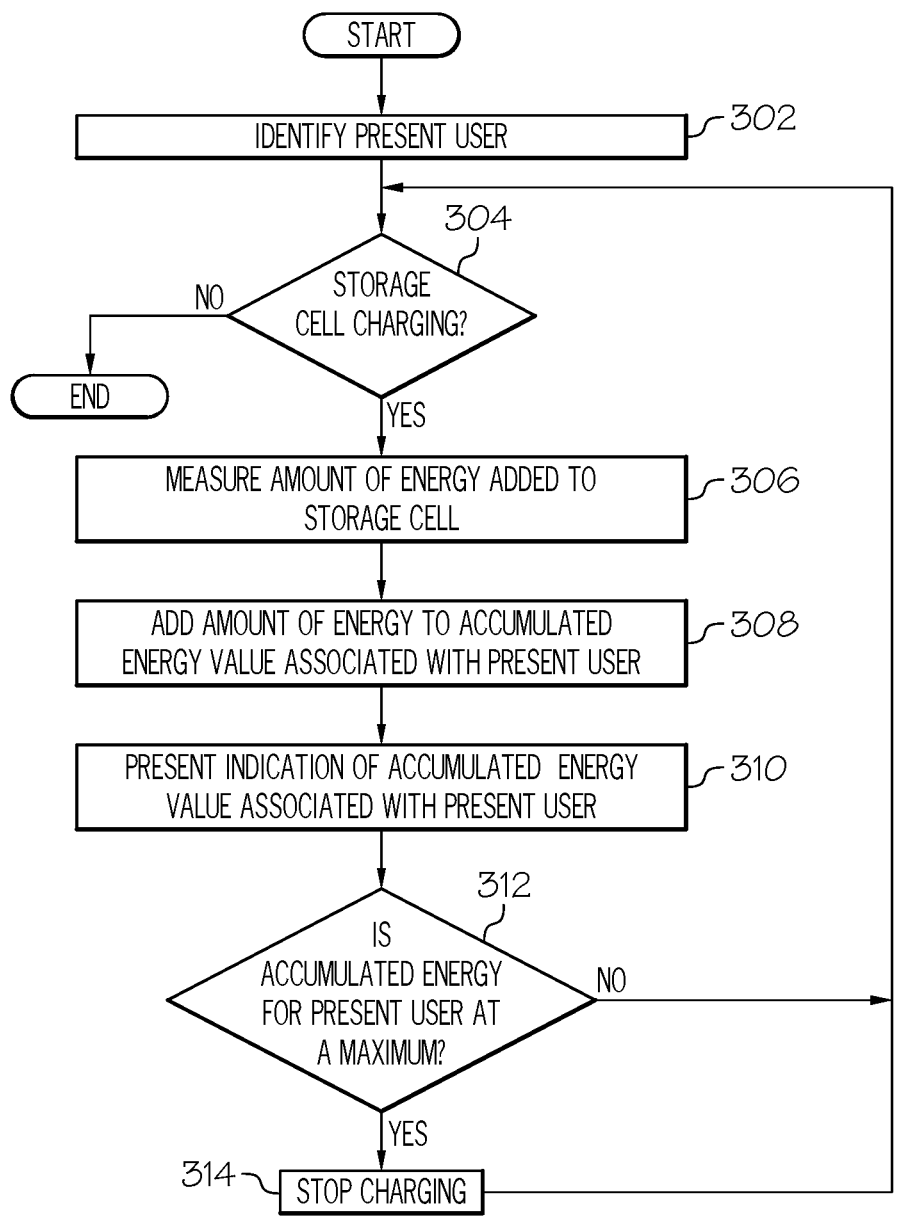
FIG. 3 illustrates an energy cell charging process, according to an example.

FIG. 3 illustrates an energy cell charging process 300, according to an example. The following description of the energy cell charging process 300 refers to the above descriptions of the example operational context 100 and the data processing architecture 200. The energy cell charging process 300 is an example of a process performed by the charging/discharging controller 246 when the electric vehicle 102 is connected to a charging station, such as the Vehicle-to-Grid charging station 106. The energy cell charging process 300 is able to be performed at other times, such as during regenerative braking while the electric vehicle 102 is operating, while the battery 120 is being charged by other means, such as solar cells on the roof of the electric vehicle 102, at other times, or at combinations of these.

The energy cell charging process 300 begins by identifying the present user, at 302. The present user is able to be identified by any suitable technique such as those discussed above. The identification of the present user in an example is stored in the present user identifier 228.

A determination is made, at 304, as to whether the energy cell is charging. In an example, the energy cell charge/discharge meter 212 provides such an indication to the processor 206. If it is determined that the energy cell is not charging, the energy cell charging process 300 ends.

If it is determined, at 304, that the energy cell is charging, the amount of energy added to the storage cell is measured, at 306. Such a measurement is able to be made by the energy cell charge/discharge meter 212.

A value of the amount of energy, as measured above at 306, is added to the accumulated energy value associated with the present user, at 308. In an example, this value is added to the accumulated energy value for the present user as is stored in the data storage 202. An indication of the accumulated energy value for the present user is presented, at 310. In an example, this value is presented on the remaining charge gauge 140.

A determination is made, at 312, as to whether the accumulated energy for the present user is at a maximum. In general, each energy sub-partition has a specified maximum amount of energy that can be allocated to that energy sub-partition. In an example, this maximum amount of energy is specified as a maximum energy value and can be expressed in any suitable manner. In an example, the maximum energy value is a specified fraction of the total energy storage capacity of the battery 120. For example, if four (4) users share the battery 120, the maximum amount of energy that can be allocated to each energy sub-partition may be limited to one fourth (¼) of the total capacity of the battery 120.

If it is determined that the accumulated energy for the present user is at a maximum for the energy sub-partition associated with the present user, charging of the battery stops, at 314. After stopping charging of the battery, or if it is determined that the accumulated energy for the present user is not at a maximum for the energy sub-partition associated with the present user, the energy cell charging process 300 then returns to the above described determining, at 304, if the energy storage cell is charging and the above described subsequent processing.

Figure 4:
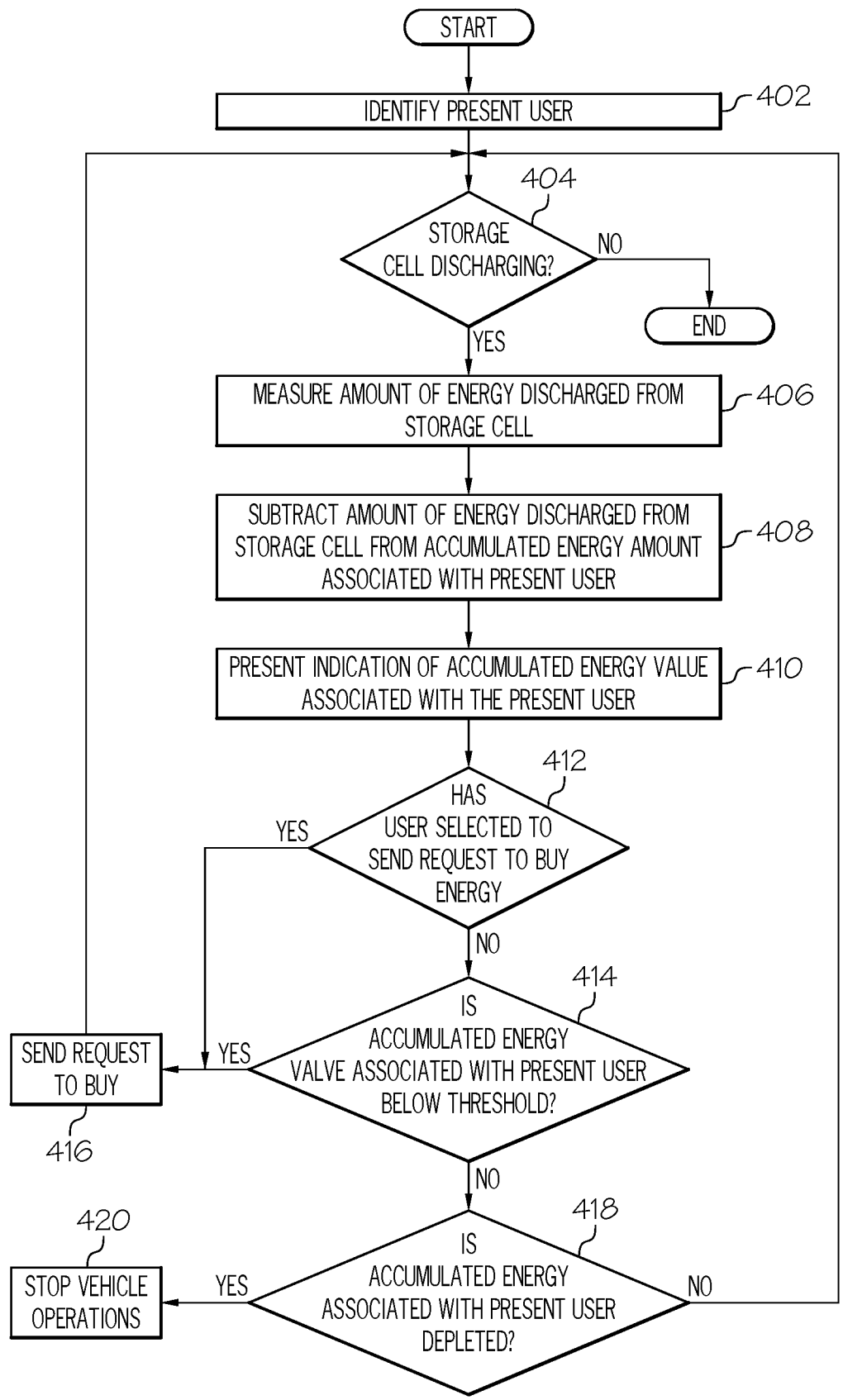
FIG. 4 depicts an energy cell discharge process, according to an example.

FIG. 4 illustrates an energy cell discharge process 400, according to an example. The following description of the energy cell discharge process 400 refers to the above descriptions of the example operational context 100 and the data processing architecture 200. The energy cell discharge process 400 is an example of a process performed by the charging/discharging controller 246 when the electric vehicle 102 is operating and drawing electrical current from the battery 120 to propel the electric vehicle 102, to operate other electrical components of the electric vehicle 102, to perform other actions that discharge the battery 120, or any combination of these.

The energy cell discharge process 400 begins by identifying the present user, at 402. The present user is able to be identified by any suitable technique such as those discussed above. The identification of the present user in an example is stored in the present user identifier 228.

A determination is made, at 404, as to whether the energy cell is discharging. In an example, the energy cell charge/discharge meter 212 provides such an indication to the processor 206. If it is determined that the energy cell is not discharging, the energy cell discharge process 400 ends.

If it is determined, at 404, that the energy cell is discharging, the amount of energy discharged from the storage cell is measured, at 406. Such a measurement is able to be made by the energy cell charge/discharge meter 212.

A value of the amount of energy, as measured above at 406, is subtracted from the accumulated energy value associated with the present user, at 408. In an example, this value is added to the accumulated energy value for the present user as is stored in the data storage 202. An indication of the accumulated energy value for the present user is presented, at 410. In an example, this value is presented on the remaining charge gauge 140.

A determination is made, at 412, as to whether the user has selected to send a request to buy energy. If the user has not made such a selection, in one example a determination is made, at 414, as to whether the accumulated energy associated with the present user is below a threshold. In some examples, a request to buy energy is able to be automatically sent to other users if the accumulated energy associated with the present user falls below a set threshold. In further examples, the determination that the accumulated energy associated with the present user is below a threshold is not made and requests to buy energy are not automatically sent.

If the user has selected to send a request to buy energy, as determined at 412, or it is determined that the accumulated energy associated with the present user falls below a set threshold, a request to buy energy is sent, at 416, to other users. If the user has not selected to send a request to buy energy, as determined at 412, and it is also determined that the is not determined to be automatically sent, such as at 414, a determination is made, at 418, as to whether the accumulated energy associated with the present user is depleted. If it is determined that the accumulated energy associated with the present user is depleted, the energy cell discharge process stops, vehicle operations, at 420. If it is determined that the accumulated energy associated with the present user is not depleted, the energy cell discharge process 400 returns to the above described determining, at 404, if the energy storage cell is discharging and the above described subsequent processing.

Figure 5:
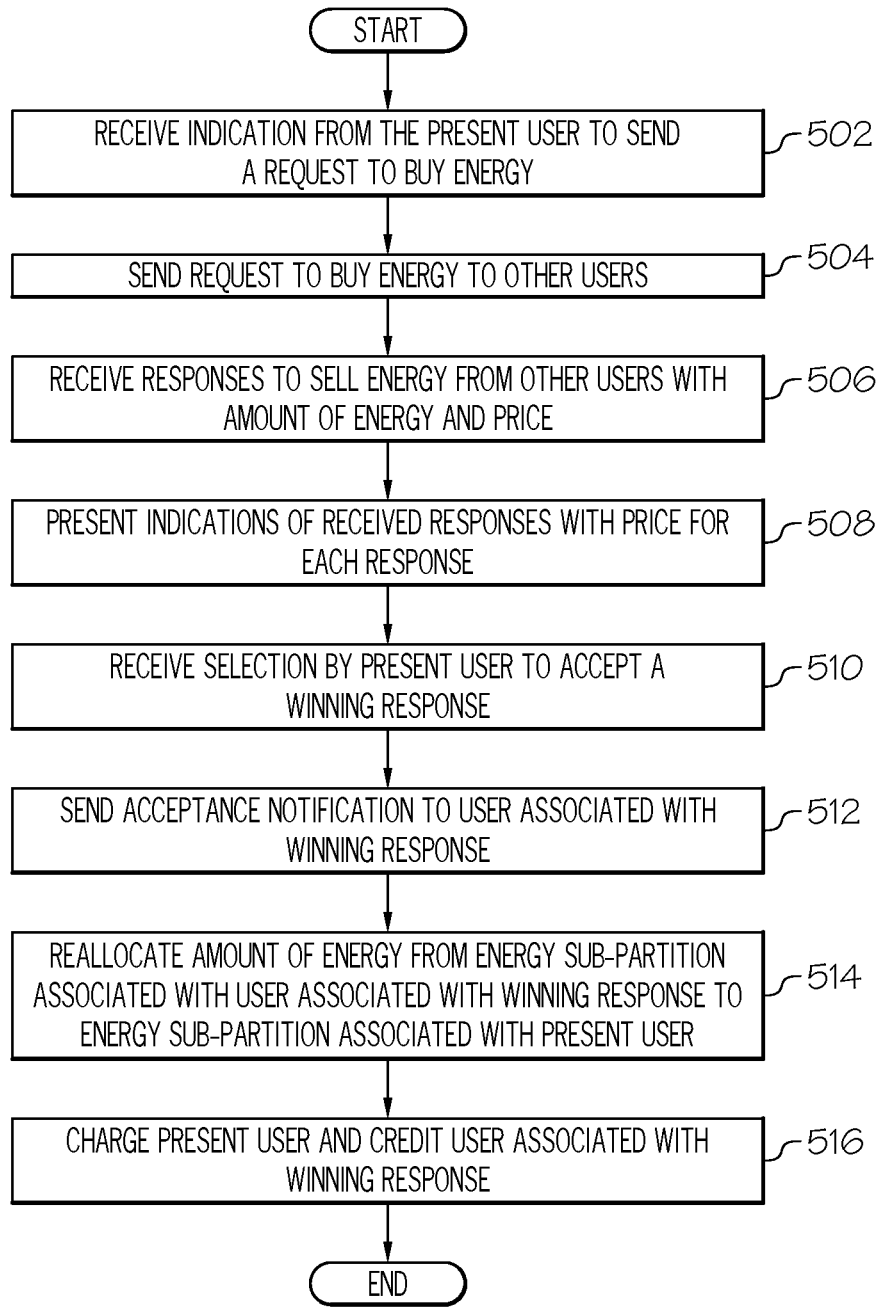
FIG. 5 illustrates a buy energy from another user process, according to an example.

FIG. 5 illustrates a buy energy from another user process 500, according to an example. The buy energy from another user process 500 is an example of a process implemented by the request to buy process 242 discussed above. The following description of the buy energy from another user process 500 refers to the above descriptions of the example operational context 100 and the data processing architecture 200.

The buy energy from another user process 500 receives, at 502, an indication from the present user to send a request to buy energy. As discussed above, such an indication is able to be received through the user interface 210, such as by pressing the "REQUEST TO BUY" button 142.

A request to buy energy is sent to other users. As described above, such a request is able to be automatically sent to all users who are associated with energy sub-partitions in the battery 120, a configured or user selectable subset of such users, a particular user whose identity is configured within the system or is user selectable, or any combination of these.

Responses to sell energy are received, at 506, from other users. In an example, such response are able to include offers to sell energy to the present user and are able to include one or more of an amount of energy to sell, a price to pay for the energy to be sold, other information, no such information, or any combination of these. In an example, receiving responses from multiple other users that each contain an offer to sell energy is an example of receiving competing responses to the request to buy energy.

Indications of received responses are presented, at 508. Such indications are able to include some or all of the information included in the responses, such as the price for the energy to be sold, the amount of the energy to be sold, other information, no information, or combinations of these.

A selection by the present user to accept a winning response is received, at 510. In an example, an acceptance notification is sent to the user associated with the winning response. In an example, the winning response is defined as the response selected by the user, such as is described above by selecting one of OFFER 1 text 144 or OFFER 2 text 146.

The amount of energy that is sold by the other user to the present user is reallocated, at 514, from the sub-partition associated with a user associated with the winning response to the energy sub-partition associated with the present user.

The present user is charged, and the user associated with the winning response is credited, at 516, with the cost of the energy sold by the winning user. The buy energy from another user process 500 then ends.

Figure 6:
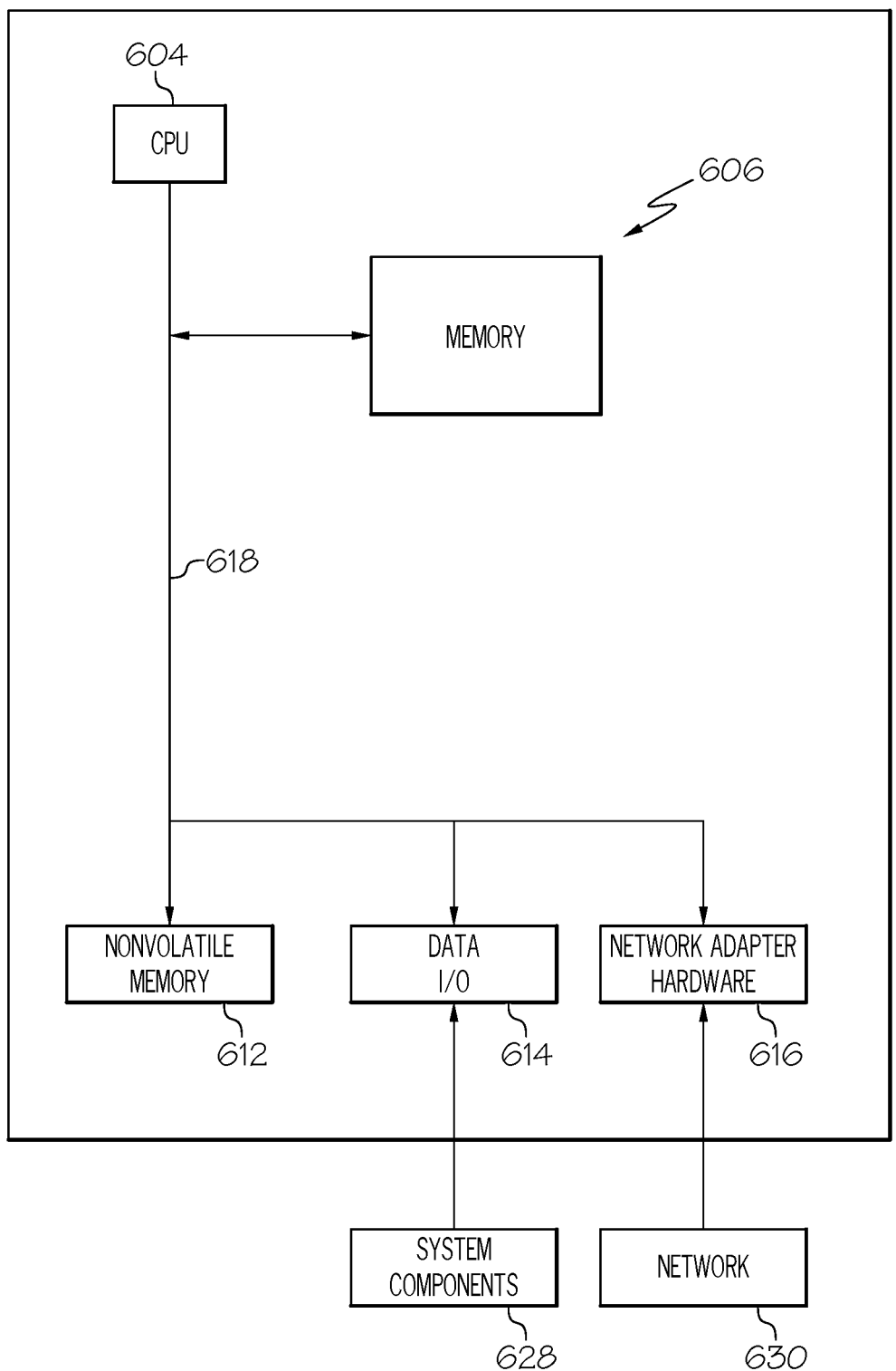
FIG. 6 illustrates a block diagram illustrating a controller, according to an example.

FIG. 6 illustrates a block diagram illustrating a controller 600 according to an example. The controller 600 is an example of a processing subsystem that is able to perform any of the above described processing operations, control operations, other operations, or combinations of these.

The controller 600 in this example includes a CPU 604 that is communicatively connected to a main memory 606 (e.g., volatile memory), a non-volatile memory 612 to support processing operations. The CPU is further communicatively coupled to a network adapter hardware 616 to support input and output communications with external computing systems such as through the illustrated network 630.

The controller 600 further includes a data input/output (I/O) processor 614 that is able to be adapted to communicate with any type of equipment, such as the illustrated system components 628. The data input/output (I/O) processor in various examples is able to be configured to support any type of data communications connections including present day analog and/or digital techniques or via a future communications mechanism. A system bus 618 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A method for managing energy stored in an energy storage cell, the method comprising:
    allocating a plurality of energy allocations for an energy storage capacity of an energy storage cell;
    associating each respective energy allocation in the plurality of energy allocations with a respective user within a plurality of users;
    re-allocating, based on an authorization from a first user in the plurality of users, a first amount of energy from an energy allocation allocated to the first user to an energy allocation associated with a second user;

determining a period during which the second user is drawing energy from the energy storage cell;

receiving, from an energy discharge monitor, a measurement of a second amount of energy that is being discharged from the energy storage cell during the period;

decreasing energy allocated to an energy allocation associated with the second user based on the second amount of energy discharged from the energy storage cell;

determining, based on decreasing energy allocated to the energy allocation associated with the second user, that a maximum energy value allocated to the energy allocation associated with the second user has been drawn from the energy storage cell; and limiting, independent of a state of charge of the energy storage cell, discharge of enemy from the enemy storage cell during the period based on determining that the maximum energy value allocated to the energy allocation associated with the second user has been drawn from the energy storage cell.

2. The method of claim 1, where the second user comprises an electrical utility, and wherein the amount of energy being discharged is delivered to an electrical grid.

3. The method of claim 1, where the second user comprises an external user, and wherein the amount of energy being discharged is drawn by the external user.

4. The method of claim 1, further comprising processing a transfer of funds from the second user to the first user, by a computer remote from the energy storage cell and connected to a processor controlling the energy storage cell via a communications component.

5. The method of claim 1, further comprising:
accumulating respective measurements of respective amounts of energy discharged from the energy storage cell and respective amounts of energy charged into the energy storage cell by each user in the plurality of users to maintain a respective accumulated energy value for the each user; and
presenting, to a third user within the plurality of users, a respective energy remaining indicator, the respective energy remaining indicator indicating an amount of energy remaining in the energy allocation associated with the third user relative to a maximum energy value allocated to the energy allocation associated with the third user.

6. The method of claim 1, further comprising:
associating a charging event of the energy storage cell with a third user within the plurality of users;
increasing energy allocated to an energy allocation associated with the third user based on energy added to the energy storage cell by the charging event; and
stopping the charging of the energy storage cell when the energy allocation associated with the third user reaches a maximum energy value allocated to the energy allocation associated with the third user.

7. The method of claim 6, wherein the energy added to the energy storage cell is not obtained from an electrical grid.

8. The method of claim 6, wherein the energy added to the energy storage cell is obtained from solar cells.

9. The method of claim 1, further comprising:
sending, by the second user to at least one respective user in the plurality of users, a request to buy an amount of energy from an energy allocation assigned to another user in the plurality of users;

receiving, based on sending the request to sell an amount of energy, at least one response each comprising a respective offer to sell energy to the second user; and
receiving an acceptance of a selected offer within the at least one response, where the selected offer is sent by the first user, and
wherein the re-allocating is based on receiving the acceptance.

10. The method of claim 9, where at least one of the request to buy or the response to sell comprises a specification of the first amount of energy.

11. The method of claim 9, where at least one of the request to buy or the response comprises a price to pay for the amount of energy, and the method further comprising charging the second user the price for the amount of energy.

12. The method of claim 9, wherein at least one of the request to buy or the response originates from a processor remote from the energy storage cell.

13. An apparatus for allocating energy stored in an energy storage cell, the apparatus comprising:
a remaining energy processor that, when operating:
allocates, to a plurality of energy allocations, a respective amount of energy stored in an energy storage cell; and
associates each energy allocation in the plurality of energy allocations with a respective user within a plurality of users;
a request to buy processor that, when operating:
determine a period during which a second user is drawing energy from the energy storage cell;
receives, from an energy discharge monitor, a measurement of a second amount of energy that is being discharged from the energy storage cell during the period;
decreases energy allocated to an energy allocation associated with the second user based on the second amount of energy discharged from the energy storage cell;
determines, based on a decrease of energy allocated to the energy allocation associated with the second user, that a maximum energy value allocated to the energy allocation associated with the second user has been drawn from the energy storage cell; and
limits, independent of a state of charge of the energy storage cell, discharge of enemy from the enemy storage cell during the period based on determining that the maximum energy value allocated to the energy allocation associated with the second user has been drawn from the energy storage cell; and
an energy re-allocation processor that, when operating re-allocates, based on an authorization from a first user in the plurality of users, a first amount of energy from an energy sub-portion allocated to the first user to an energy sub-portion associated with the second user.

14. The apparatus of claim 13, where the second user comprises an electrical utility, and wherein the amount of energy being discharged is delivered to an electrical grid.

15. The apparatus of claim 13, wherein the request to buy processor is further configured to, when operating,
send, by the second user to at least one respective user in the plurality of users, a request to buy an amount of energy from an energy allocation assigned to another user in the plurality of users;
receive, based on sending the request to sell an amount of energy, at least one response each comprising a respective offer to sell energy to the second user; and receive an acceptance of a selected offer within the at least one response, where the selected offer is sent by the first user and wherein the energy re-allocation processor reallocates re-allocates the first amount of energy from an energy sub-portion allocated to the first user to the energy sub-portion associated with the second user based on receiving the acceptance.

16. The apparatus of claim 13, where the request to buy processor comprises a local processor component and a remote processor component, where the local processor component is located with the apparatus and where the remote processor component is remote from the apparatus and is connected to the apparatus via a communications component.

17. The apparatus of claim 13, wherein the remaining energy processor, when operating, further:

associates a charging event of the energy storage cell with a third user within the plurality of users;

increases energy allocated to an energy allocation associated with the third user based on energy added to the energy storage cell by the charging event; and stops the charging of the energy storage cell when the energy allocation associated with the third user reaches a maximum energy value allocated to the energy allocation associated with the third user.

18. The apparatus of claim 17, wherein the energy added to the energy storage cell is obtained from solar cells.

19. A computer program product for allocating electrical energy within a storage cell, the computer program product comprising:

a non-transitory computer readable storage medium having computer readable program code embodied therewith, the computer readable program code comprising instructions for:

allocating, to a plurality of energy allocations, a respective amount of energy stored in an energy storage cell;

associating each energy allocation in the plurality of energy allocations with a respective user within a plurality of users;

re-allocating, based on an authorization from a first user in the plurality of users, a first amount of energy from an energy sub-portion allocated to the first user to an energy sub-portion associated with a second user;

determining a period during which the second user is drawing energy from the enemy storage cell;

receiving, from an enemy discharge monitor, a measurement of a second amount of energy that is being discharged from the energy storage cell during the period;

decreasing energy allocated to an energy allocation associated with the second user based on the second amount of energy discharged from the energy storage cell;

determining, based on decreasing energy allocated to the energy allocation associated with the second user, that a maximum enemy value allocated to the enemy allocation associated with the second user has been drawn from the enemy storage cell; and limiting, independent of a state of charge of the energy storage cell, discharge of energy from the energy storage cell during the period based on determining that the maximum energy value allocated to the energy allocation associated with the second user has been drawn from the energy storage cell.

* * * * *

UNITED STATES PATENT AND TRADEMARK OFFICE
CERTIFICATE OF CORRECTION

PATENT NO. : 11,667,212 B2
APPLICATION NO. : 17/521358
DATED : June 6, 2023
INVENTOR(S) : Rachana Vidhi et al.

Page 1 of 1

It is certified that error appears in the above-identified patent and that said Letters Patent is hereby corrected as shown below:

In the Claims

In Column 13, Line 19 Claim 1 change "enemy" to "energy" in both places.

In Column 14, Line 44 Claim 13 change "enemy" to "energy", Line 46 change "enemy" to "energy" in both places.

In Column 16, Line 14 Claim 19 change "enemy" to "energy", Line 15 change "enemy" to "energy", Line 24 change "enemy" to "energy" in both places, Line 26 change "enemy" to "energy".

Signed and Sealed this
Ninth Day of January, 2024

Katherine Kelly Vidal
*Director of the United States Patent and Trademark Office*